United States Patent [19]

Gottlieb et al.

[11] Patent Number: 4,602,342
[45] Date of Patent: Jul. 22, 1986

[54] ACOUSTO-OPTIC TUNABLE FILTER

[75] Inventors: Milton Gottlieb, Churchill; Anselm Wachtel, Penn Hills, both of Pa.

[73] Assignee: Westinghouse Electric Corp., Pittsburgh, Pa.

[21] Appl. No.: 539,022

[22] Filed: Oct. 4, 1983

[51] Int. Cl.$^4$ .......................... G02F 1/33; G02F 1/11; G02B 5/30

[52] U.S. Cl. .................................. 364/498; 350/358; 350/372

[58] Field of Search ............... 250/343; 350/358, 372; 356/51, 437, 438, 439; 364/497, 498

[56] References Cited

U.S. PATENT DOCUMENTS

| | | | |
|---|---|---|---|
| 3,632,193 | 1/1972 | Kusters | 350/372 |
| 3,679,288 | 7/1972 | Harris | 350/372 |
| 3,701,583 | 10/1972 | Hammond | 350/372 |
| 3,701,584 | 10/1972 | Runge | 350/358 X |
| 3,756,689 | 9/1973 | Hammond et al. | 350/372 |
| 3,944,334 | 3/1976 | Yano et al. | 350/372 X |
| 3,988,671 | 10/1976 | Pedinoff | 350/372 X |
| 4,052,121 | 10/1977 | Chang | 350/372 |
| 4,272,825 | 6/1981 | Smithline et al. | 350/372 X |
| 4,422,154 | 12/1983 | Smithline et al. | 350/372 X |
| 4,505,550 | 3/1985 | Steinbruegge | 350/372 |
| 4,512,638 | 4/1985 | Sriram et al. | 350/372 |

OTHER PUBLICATIONS

"Elastic Properties of $Hg_2Cl_2$ Crystals", by Sil'vestrova et al; Sov. Phys. Crystallogr., vol. 20, No. 2, 1975: pp. 221-224.

"Acousto-Optical Properties of Calomel Crystals $Hg_2Cl_2$", by Sil'vestrova et al; Sov. Phys. Crystallogr., vol. 20, No. 5, 1976: pp. 649-651.

"Automated Acousto-Optical Tunable Filter (AOTF) Infrared Analyzer", by Steinbruegge et al; Proceedings of SPIE, The International Society of Optical Engineering, vol. 268 (1981): pp. 160-166.

Primary Examiner—Felix D. Gruber
Assistant Examiner—Edward R. Cosimano
Attorney, Agent, or Firm—Thomas R. Trempus

[57] ABSTRACT

An improved acousto-optic tunable filter infrared analyzer system useable in a variety of industrial and commercial combustion control applications includes an acousto-optic tunable filter having a crystalline material selected from the group consisting of mercurous chloride, mercurous bromide and mercurous iodide. Selectively polarized infrared radiation is passed at a predetermined plane of incidence to the crystal axis, which plane contains both the (110) and (001) axes. The system relies upon a narrow band pass tunable acousto-optic filter which is selectively tuned by predetermined rf frequency signals to selectively transmit the narrow band pass of interest which corresponds to a specific molecular species for identification and analysis. The system includes a microcomputer and associated memory function to measure and compare detected signals from an infrared detector which converts the filtered infrared signal to an electrical signal. The memory provides control signals for the computer and for controlling the sequence and frequency of rf energy applied to tune the filter. In this way, the near to far range infrared can be analyzed for absorption bands corresponding to predetermined molecular species such as combustion product gases, and a feedback signal generated to control the combustion process.

10 Claims, 4 Drawing Figures

ACOUSTO-OPTIC TUNABLE FILTER

BACKGROUND OF THE INVENTION

The present invention relates to acousto-optic tunable filters and particularly, a design configuration for a non-collinear acousto-optic tunable filter using a crystalline material consisting of either mercurous chloride, mercurous bromide or mercurous iodide.

The term acousto-optic filter refers to the fact that in certain birefringent optical materials, a light beam propagating as an extraordinary ray, can under certain conditions be converted into an ordinary ray (or vice-versa) by interaction with, and diffraction from, an acoustic wave propagating in the same medium. This phenomenon has been utilized in producing narrow band optical filters in which the peak transmission wavelength can be selected by properly choosing the frequency of the acoustic wave.

It is known to use an acousto-optic tunable filter such that optical and acoustic waves propagate collinearly in a suitable birefringent crystal. The light transmittal by the crystal is controlled by the acoustic frequency and power level. Only a very small number of crystal materials can be used in such a collinear device because the required interaction, determined by the photoelastic tensor components, is non-zero for only a few special cases. An example of the aforedescribed collinear configuration is taught in U.S. Pat. No. 3,679,288 to Harris. A non-collinear configuration in an acousto-optic tunable filter is taught by U.S. Pat. No. 4,052,121 to Chang in which the requirements on the crystal properties are relaxed so that a larger number of materials can be utilized.

The development of new efficient infrared acousto-optic materials such as thallium-arsenic-selenide ($Tl_3AsSe_3$) as described in U.S. Pat. No. 3,792,287, thallium phosphorus-selenide per U.S. Pat. No. 3,929,970 and thallium-arsenic-sulfide per U.S. Pat. No. 3,799,659 all owned by the assignee of the present invention, provides the possibility of operation over the near-to-mid infrared range of from about 1.3 micrometers to about 16 micrometers.

A large and growing market exists for analytical devices which can be used to analyze reaction products of a wide variety of industrial processes. In addition on-line real time combustion product analyzers are needed to facilitate more efficient burning of hydrocarbon fuels. Multi-function combustion product analyzers are needed to keep track of combustion emission and to ensure that the emission is within the limits set by environmental legislation. On-line multifunction analyzers are needed in the chemical and petroleum industries to function as process analyzers to facilitate process control systems. The petroleum industry as well as the emerging synthetic fuel industry has need for compact, stable and simple analytical instruments for determining hydrocarbon fractions.

The analytical devices to date utilize ultraviolet and infrared spectrophotometry, as well as gas and liquid chromatography in meeting the laboratory and industrial needs outlined above. Such optical instruments as well as the system of the present invention utilize the following important characteristics of materials. A particular molecule has a characteristic absorption spectrum which is dissimilar from that of all other molecules. The spectra of mixtures of molecules are additive and the absorption is proportional to the concentrations of the molecules. Optical absorption spectra can be obtained from any type of sample be it solid, liquid, or gas so long as the sample is optically transmissive, and the spectra can be obtained in a non-destructive testing of the sample.

Infrared radiation is particularly suited for analyzing complex streams of hydrocarbons and combustion products because of the infrared absorption characteristics of the major gases produced in such systems. The existing infrared analytical systems typically are limited to measuring a single wavelength of interest at a given time. Such infrared instruments utilize prisms, selectively absorptive filters, or diffraction gratings so that the filtering mechanism can require mechanical changing of the optical filter element in order to function over a variety of wavelengths. Such mechanical changeovers require realignment of the systems which are time consuming and difficult to achieve at an on-site location.

It is an object of this invention to provide a non-collinear acousto-optic filter for use from the visible through its transmission range in the infrared region of the spectrum to 20 micrometers, with other mercurous halide crystals extending this to 40 micrometers.

It is another object of this invention to provide a non-collinear acousto-optic tunable filter in which the plane of incidence of both the light and the acoustic waves is the plane containing the (001) and (110) crystallographic directions.

It is yet another object of this invention to provide a crystal material for use in the present non-collinear, acousto optic tunable filter system, which crystal material has a tetragonal, Class D (4h) crystal structure.

SUMMARY OF THE INVENTION

An improved non-collinear acousto-optic tunable filter AOTF consisting of a mercurous chloride crystal is utilized in combination with an infrared analyzer system. Selectively polarized infrared radiation is passed at a predetermined plane of incidence to the crystal axis. The plane of incidence contains both the (110) and (001) axes. Acoustic waves are launched into the crystal along the (110) and (001) axes. The infrared radiation propagates through the mercurous chloride crystal AOTF at an angle equal to approximately ten degrees to the (001) crystallographic axes.

The design configuration utilized in the mercurous chloride AOTF of the preferred embodiment of this invention can also be employed in other mercury halide crystals. For example, mercurous bromide and mercurous iodide crystals have the same crystal structure as mercurous chloride and have been determined to have acceptable acousto-optic properties.

BRIEF DESCRIPTION OF THE DRAWINGS

The above as well as other features and advantages of the invention will become apparent through consideration of the detailed description in connection with the accompanying drawings in which.

DESCRIPTION OF THE PREFERRED EMBODIMENTS

The present invention provides a non-collinear acousto-optic tunable filter (AOTF) consisting of a mercurous chloride (HG$_2$Cl$_2$) crystal in which the plane of incidence is selected to be that plane containing the (110) and (001) axes.

Figure 1:
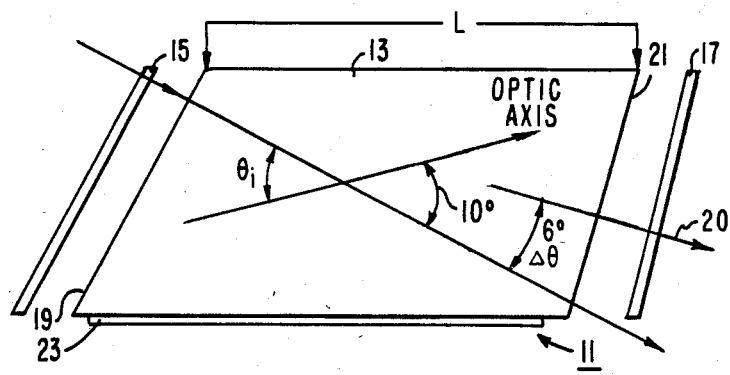
FIG. 1 is a schematical representation of a non-collinear acousto-optic tunable filter illustration the operation concepts thereof.

Turning to FIG. 1, a schematic representation of a typical non-collinear acousto-optic tunable filter illustrates the general operating characteristics of such devices. The acousto-optic tunable filter 11 includes an acousto-optic crystal 13, an input polarizer 15 and an output polarizer 17. The input optical face 19 of the crystal 13 is typically cut so as to be normal to the incident infrared beam while the output beam 20 is diffracted at an angle of about 6° to the incident beam and the exit optical face 21 is cut so as to be normal to this diffracted beam. An acoustic transducer 23 is mated to one of the opposed side surfaces of the crystal 13 and can typically consist of an X-cut lithium niobate crystal plate which is efficiently coupled to the acoustic crystal. A conductive electrode pattern is provided on the lithium niobate transducer substrate. This electrode pattern is in communication with and driven by an rf system.

The light to be analyzed is polarized by the input polarizer 15, and incident on the acousto optic crystal 13 at an angle $\theta_i$ to the optical axis of the crystal. Acoustic waves are generated in the crystal by means of the transducer 23 bonded to the crystal 13. When the transducer is driven at a chosen frequency, f, light of a predetermined wavelength interacts with the acoustic waves, such that there is a rotation of its polarization by 90 degrees and it is directed to a different angle. The relation between the applied frequency, f, and the filtered wavelength which exits the acousto-optic tunable filter is:

$$f = \frac{v\Delta n}{\lambda} \sqrt{\sin^4\theta_i + \sin^2 2\theta_i}$$

where f is the applied frequency, v is the acoustic velocity, $\Delta n$ is the birefringence and $\lambda$ is the optical wavelength, and the angle through which the filtered light beam is deflected is:

$$\Delta\theta = \tfrac{1}{2}\sin 2\theta_i$$

One of the limitations on acousto-optic tunable filters at long wavelengths is the rf power required to achieve efficient operation. The rf power requirement, P, increases as the square of the wavelength, according to the relation:

$$P \sim [\lambda^2/(M_2 L)]$$

where $\lambda$ is the optical wavelength, L is the length of the acousto-optic crystal and $M_2$ is the acousto-optic figure of merit for the crystal material being utilized in the device. The figure of merit is given by the statement:

$$M_2 = (n^6 p^2)/(\rho v)$$

where n is the refractive index, p is the relevant component of the photo-elastic tensor, and $\rho$ is the density of the material. Thus, it is known that for efficient operation at long wave infrared, a very large value for the figure of merit is required, which is the case for Hg$_2$Cl$_2$.

Figure 2:
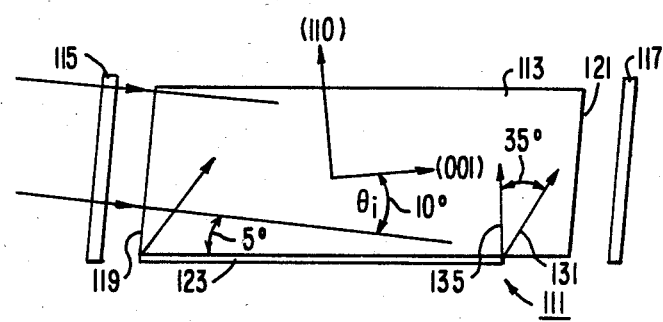
FIG. 2 is a schematical representation of a non-collinear acousto-optic tunable filter using the crystal mercury chloride ($Hg_2Cl_2$), all according to the teachings of this invention.

Turning now to FIG. 2, the specific design configuration of the present invention for a non-collinear acousto-optic tunable filter utilizing a crystalline material consisting of either mercurous chloride mercurous bromide or mercurous iodide crystal is presented. An acousto-optic tunable filter 111 preferably includes a mercurous chloride crystal 113, an input polarizer 115 and an output polarizer 117. Mercurous chloride is a material having a very high acousto-optic figure of merit and it transmits light in the infrared to 20 micrometers as well as to shorter wavelengths through the visible range of the spectrum. In the present design application, a mercurous chloride acousto-optic tunable filter is utilized as an efficient, wide band acousto-optic tunable filter system.

The crystal structure of mercury chloride (Hg$_2$Cl$_2$) is tetragonal, Class D (4h), which is the same as that of tellurium dioxide, a material well known for its favorable acousto-optic properties. The elastic properties and the acousto-optical properties of the crystal of calomel Hg$_2$Cl$_2$ are described respectively in the articles "Elastic Properties of Hg$_2$Cl$_2$ Crystals", I. M. Silvestrova, Ch. Barta, G. F. Dobrzhanskii, L. M. Belyaev, and Yu. V. Pisarevskii—Sov. Pgys. Crystallography 20, 221 (1975), and "Acousto-Optical Properties of Calomel Crystals Hg$_2$Cl$_2$", I. M. Silvestrova, Ch. Barta, G. F. Dobrzhanskii, L. M. Belyaev, and Yu. V. Pisarevskii—Sov. Phys. Crystallography 20, 649 (1976). The contents of both of the aforedescribed articles are incorporated herein by reference. The tetragonal crystal structure of mercurous chloride is compatible with the non-collinear acousto-optic tunable filter design of this invention.

The acousto-optic crystal 113 has an input optical face 119 and an exit or output optical face 121. A piezeoelectric transducer 123 is operably associated with one side of the crystal 113 so that acoustic shear waves propagate in the general direction of the (110) axis of the crystal as schematically illustrated in FIG. 2. Typically, the transducer 123 is an X-cut lithium niobate crystal plate which is coupled through bonding to the acoustic crystal. A conductive electrode pattern is provided on the transducer substrate and is driven by the rf system which will be described hereafter.

As shown schematically in FIG. 2, the plane of incidence for the polarized light input is the crystal plane containing the (110) and (001) axes. This choice of crystal axes utilizes the large values of the photoelastic tensor, as well as the anomalously low velocity of acoustic shear waves propagating approximately in the direction of the (110) axis. The polarized light input is incident to the optic axis of the mercurous chloride crystal at a value of $\theta_i$ selected to be approximately 10 degrees. It has been determined that the acoustic frequency range corresponding to any optical wavelength range increases as $\theta_i$ increases. Accordingly, for wavelengths in the visible spectrum, these acoustic frequencies will be too high for low loss propagation for values of $\theta_i$ much greater than the preferred value of 10 degrees. It has also been determined that the acoustic properties of a mercurous chloride crystal are very anisotropic in the chosen plane of incidence, i.e., the (110) and (001) axes.

As a result, the acoustic wave is subject to a large "walk-off" angle. A walk-off angle reflects the difference between the direction of acoustic wavefront propagation from the transducer and the acoustic energy flow. In FIG. 2, the acoustic energy flow as indicated by the arrow 131 is 35 degrees from the wavefront propagation direction as indicated by the arrow 135. The walk-off angle increases sharply for larger values of $\theta_i$, the angle of incidence of the input light relative to the optic axis of the crystal and often results in designs which make inefficient use of the crystal volume.

Figure 3:
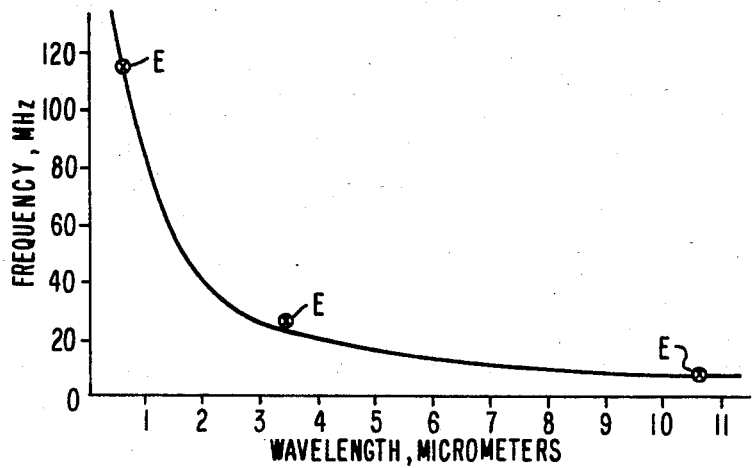
FIG. 3 is a graph illustrating the tuning curve for a 10° off-axis $Hg_2Cl_2$ acousto-optic tunable filter which compares the theoretical tuning curve with experimentally obtained data.

The present configuration substantially eliminates the above as well as other drawbacks in existing acousto-optic device designs. For example, turning to FIG. 3, a graph illustrates the tuning curve for an $Hg_2Cl_2$ acousto-optic tunable filter incorporating the design concepts of this invention. Specifically, the plot of the theoretical tuning curve is compared against experimentally obtained points indicated by the reference character "E". In order to verify the design concepts and material characteristics of the mercurous chloride AOTF, a device according to the specifications described elsewhere herein was fabricated and tested. The interaction length was approximately 1 cm. Measurements were made using laser radiation at the wavelengths of 0.6328 μm, 3.39 μm and 10.6 μm. The transducer was operated at its various overtones to tune the rf input to the transducer for peak transmission at each of the above wavelengths. These frequencies are shown plotted against wavelength, as at 'E', against the theoretical tuning curve. The agreement with the design theory presented here is excellent and constitutes proof of the operational capabilities of the present invention.

The design configuration utilized in the mercurous chloride AOTF of the preferred embodiment of this invention can also be employed in other mercury halide crystals. For example, mercurous bromide and mercurous iodide crystals have the same crystal structure as mercurous chloride and have been determined to have acceptable acousto-optic properties. The transmission of these crystals extends to longer wavelengths: 30 micrometers for $Hg_2Br_2$ and 40 micrometers for $Hg_2I_2$.

Figure 4:
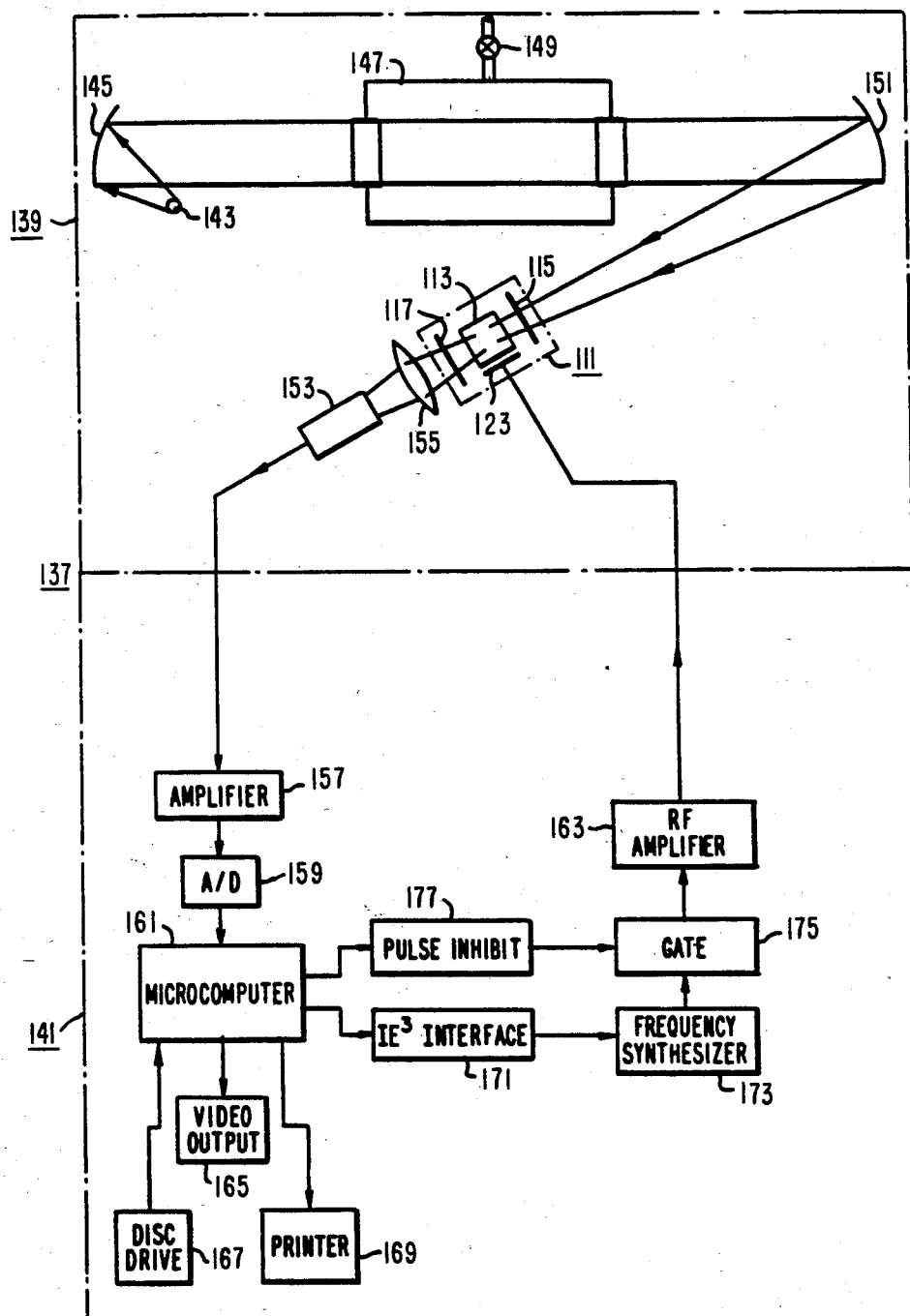
FIG. 4 is a schematic diagram of an automated infrared analyzer system utilizing the acousto-optic tunable filter of this invention.

Considering FIG. 4, an automated acousto-optic tunable filter infrared analyzer system is generally indicated by the reference character 137 and is comprised of several subsystems and components including an acousto-optic tunable filter 111 according to this invention.

An automated acousto-optic tunable filter infrared analyzer system 137 is seen configured from several subsystems and components. The analyzer system 137 can be viewed as having two major subsystems, an optical system 139, and an electronic system 141. The optical system 139 of the analyzer system 137 is essentially an infrared solid-state spectrometer which has been designed to permit operation over a relatively wide spectral range. An infrared radiation source 143 such as a Nernst glower is used as the primary source of broadband infrared radiation for the system. A portion of the output infrared radiation from the source 143 is collected and collimated by mirror 145. The collimated beam from mirror 145 passes through a sample cell 147 which contains the sample species or material to be analyzed. The sample material may be a gas such as methane, carbon dioxide, carbon monoxide, which exhibits narrow band absorption in the infrared and can be introduced to sample cell 147 via valve 149. A second mirror 151 is aligned with the first mirror 145 to collect the collimated beam after it passes through the sample cell 147, with the second mirror 151 directing the beam to the acousto-optic tunable filter 111.

The infrared radiation transmitted through the acousto-optic member is passed to an infrared sensitive pyroelectric infrared detector 153 which is operable over a wide spectral range. A focusing lens 155 can be utilized to focus the filter radiation of interest upon the infrared detector 153. It is possible to dispense with the output polarizer and to utilize the angular off-axis offset of about 6 degrees from the optical axis along which the polarized interacted narrow bandwidth wavelength of interest is directed to separate the filtered signal. In this case, the infrared detector 153 would be aligned along this offset axis to receive the selected narrow bandwidth of interest.

The selected rf tuning needed to select and distinguish a desired narrow bandwidth of interest for analysis is had from the relationship:

$$\lambda_O = [(V_a \Delta n)/f] \times (\sin^4\theta_i + \sin^2 2\theta_i)^{\frac{1}{2}}$$

where $\lambda_O$ is the wavelength at the bandwidth of interest, $V_a$ is the acoustic velocity, $\Delta n$ the birefringence, f the radio frequency, and $\theta_i$ the angle which the incident light beam makes with the c axis or optic axis of the crystal. In setting up or aligning the system a helium neon laser of known wavelengths can be directed along the optical path and rf energy of a frequency associated with the selected wavelength applied to the transducer and crystal, with the crystal being oriented to align the angle of incidence to the optic axis that gives optimal transmission of the selected wavelength of interest.

The electronic system 141 will now be described. The analog output signal from the infrared detector 153 is fed to an amplifier 157 and to analog to digital converter 159 with the resultant digital signal applied to microcomputer 161. The electrical subsystem 141 interfaces with the optical subsystem at the acousto-optical tunable filter 111 via the transducer 123 which is connected to the rf amplifier 163 from which selected frequency of rf drive power is applied via the transducer 123 to launch acoustic waves in the crystal 113. In this way optically filtered infrared signals can be detected and utilized by the microcomputer to determine the absorption resulting from the presence of selected gases in this sample cell. The microcomputer 161 typically has a video output means 165 associated therewith for visual display of the detected signals, as well as memory means 167 and a printer 169. The memory means 167 stores the control and operation signals for the system. The microcomputer 161 through an appropriate interface means 171, when supplied with control signals from memory means 167, controls the output frequency and amplitude from a frequency synthesizer 173, which is connected by a gate means 175 to the rf amplifier 163 for pulse operation. The gate 175 is utilized in conjunction with a pulse inhibit circuit means 177 to provide assurance that the rf pulses of the proper width are applied to the transducer while the rf power duty cycle is limited to a load level which does not overheat the crystal. The system is thus capable of operating not only as a rapidly tunable narrow band infrared filter but also as a solid state optical chopper as well. Control signals from memory means 167 is applied to the microcomputer 161 to sequentially apply rf pulses typically about 3.5 microseconds long at about 10 watts peak power over the operating frequency range of about 20 to 100 megahertz to the transducer of the filter. The pulses are designed to cause the filter to be transmissive at a reference wavelength where there is no absorption and then at a wavelength where a known gas has a relatively strong absorption. In addition to rapidly sampling the absorption wavelength for a variety of gases the system is initialized with no gas present to yield the same amplitude signal as measured by the analog to digital converter for the reference wavelength and at the gas absorption wavelength. The microcomputer can then be utilized to generate feedback process control signals as a function of the analysis to control the particular process such as combustion which is being analyzed.

The system with a TAS, $\theta_i = 30°$ AOTF has been utilized in sampling conventional combustion product gases such as carbon dioxide which is detected when rf frequency of 32.5 megahertz is applied and the resulting passband wavelength indicative of carbon dioxide is at 4.2 micrometers. For nitrous oxide the rf frequency is 30.395 megahertz yielding a passband wavelength of 4.5 micrometers. For carbon monoxide an rf frequency of 29.101 megahertz yields a passband wavelength of 4.7 micrometers, while for methane an rf frequency of 49.335 megahertz yields a passband wavelength of 3.39 micrometers, and for sulfur dioxide an rf frequency of 18.483 megahertz yields a passband wavelength of 7.24 micrometers.

The system of the preferred embodiment is a non-collinear system where the input infrared radiation is directed at a specified angle relative to the mercurous chloride crystal axis. The system described herein is set forth in greater detail in, "Automated Acousto-Optic Tunable Filter (AOTF) Infrared Analyzer", Proceedings of SPIE, The International Society of Optical Engineering, Volume 268, p. 160–166, the contents of which are incorporated herein by reference. What has been described in an improved non-collinear acousto-optic tunable filter preferably having a mercurous chloride crystal and an improved automated acousto-optic tunable filter infrared analyzer system having in combination therewith the aforedescribed mercurous chloride crystal. Additionally, the acousto optic tunable filter design configuration of this invention can utilize a crystalline material selected from the group consisting of mercurous chloride, mercurous bromide and mercurous iodide.

What is claimed is:

1. In combination with an automated acousto-optic tunable filter infrared analyzer system comprising:
    (a) means for directing infrared radiation through a sample species to be analyzed, which species have predetermined infrared absorption characteristics;
    (b) means for focusing the infrared radiation upon an acoustic-optic tunable filter;
    (c) an acoustic-optic tunable filter comprising an input polarizer for selectively polarizing the infrared radiation, and an optically aligned acoustic-optic crystal through which the selectively polarized infrared radiation is passed at a predetermined plane of incidence to the crystal optic axis, an acoustic transducer means coupled to a variable frequency rf power source and to the acoustic-optic crystal to launch acoustic waves in the crystal to interact with a selected narrow bandwidth portion of the polarized infrared radiation to make it distinguishable from the remaining infrared radiation, which selected narrow bandwidth portion is a function of the frequency of the rf energy and acoustic waves;
    (d) an rf energy source connected to the acoustic transducer of the acousto-optic tunable filter;
    (e) infrared radiation detection means which detects the output filtered infrared radiation from the filter and generates an output electrical signal as a function of the output filtered infrared radiation;
    (f) computing means to which the detection means output electrical signal is applied for determining the species present in the sample cell, and including means for selectively actuating the rf energy source to determine the timing and frequency of rf energy applied to the acoustic transducer mated to the acousto-optic crystal to determine the infrared wavelength selectivity or tuning of the acousto-optic tunable filter;

the improvement wherein said acousto-optic crystal is a selected mercurous halide crystal and the plane of incidence to the crystal axis is that plane containing both the (110) and (001) axes, and wherein the acoustic waves launched into said mercurous halide crystal are in the plane of said crystal containing both the (110) and (001) axes, and wherein the infrared radiation propagates through the mercurous halide crystal at an angle equal to approximately ten degrees to the (001) crystallographic axis and wherein said acousto-optic crystal has an input face which is cut so as to be normal to the incident infrared beam which beam output is diffracted at an angle of about six degrees to the incident beam and wherein said acousto-optic crystal has an exit optical face which is cut so as to be normal to the diffracted output beam.

2. The improved analyzer system set forth in claim 1, wherein the means for directing infrared radiation through a sample cell comprises a collimating mirror, which means for focusing the collimated infrared radiation transmitted through the sample cell comprises a focusing mirror.

3. The improved analyzer system set forth in claim 1, wherein the acousto-optic tunable filter includes an output polarizer which is optically aligned with the input polarizer and the acousto-optic crystal, which output polarizer is oriented transversely to the input polarizer to only transmit a selected narrow bandwidth portion of the infrared radiation.

4. The improved analyzer system set forth in claim 1, wherein the infrared radiation detection means comprises an infrared sensitive pyroelectric detector.

5. The improved analyzer system set forth in claim 1, wherein computing means includes a microprocessor and memory means for comparing the detected signal to predetermined molecular species indicative signals stored in the memory means, and wherein the memory means provides a predetermined sequence of signals which are applied to the microprocessor to be applied to a frequency synthesizer to vary the frequency of the rf energy applied to the transducer means coupled to the acousto-optic crystal to vary the selection of the narrow bandwidth portion of the infrared radiation which is analyzed, and wherein predetermined frequencies corresponding to predetermined molecular sample species are applied.

6. The improved analyzer system set forth in claim 1, wherein the sample species are provided in a sample cell which is disposed between the means for directing the infrared radiation and the means for focusing the infrared radiation upon the acousto-optic tunable filter.

7. The improved analyzer system set forth in claim 1, wherein the rf energy source includes an rf energy frequency synthesizer coupled by electronic signal gate means amplifier which is connected to the acoustic transducer, and the computing means includes a microprocessor and memory means for applying sequential pulsed control signals to the rf frequency synthesizer to predeterminedly vary the frequency of the rf energy applied to the acousto-optic tunable filter, and wherein control signals are applied to the electronic signal gate means to provide pulse width modulated rf energy to the rf amplifier.

8. The improved analyzer system set forth in claim 1 wherein the mercurous halide crystal is selected from the group consisting of mercurous chloride, mercurous bromide and mercurous iodide.

9. An acoustic-optic tunable filter comprising:

an input polarizer for selectively polarizing infrared radiation, an optically aligned mercurous chloride crystal acousto-optic tunable filter through which the selectively polarized infrared radiation is passed at a plane of incidence containing both the (110) and (001) crystal axes;

an acoustic transducer means coupled to a variable frequency rf energy source and to said mercurous chloride crystal to launch acoustic waves into said crystal in the plane of said crystal containing both the (110) and (001) axes and wherein the infrared radiation propagates through the mercurous chloride crystal at an angle equal to approximately ten degrees to the (001) crystallographic axis in order, said acoustic waves interacting with a selected narrow bandwidth portion of the polarized infrared radiation in order to make it distinguishable from the remaining infrared radiation, which selected narrow bandwidth portion if a function of the frequency of the rf energy and the acoustic waves.

10. An acousto-optic tunable filter comprising:

an input polarizer for selectively polarizing infrared radiation, an optically aligned acousto-optic tunable filter of a crystalline material selected from the group consisting of mercurous chloride, mercurous bromide and mercurous iodide through which the selectively polarized infrared radiation is passed at a plane of incidence containing both the (110) and (001) crystal axes; and an acoustic transducer means coupled to a variable frequency rf energy source and to said AOTF crystal to launch acoustic waves into said crystal in the plane of said crystal containing both the (110) and (001) axes in order to interact with a selected narrow bandwidth portion of the polarized infrared radiation which propagates through said crystal at an angle equal to approximately ten degrees to the (001) crystallographic axis, in order to diffract the selected narrow bandwidth portion and make it distinguishable from the remaining infrared radiation, which selected narrow bandwidth portion is a function of the frequency of the rf energy and the acoustic waves said crystal having an optical input and optical output face, which input face is normal to the polarized infrared radiation and which output face is normal to the diffracted infrared radiation.

* * * * *